US012750860B2

(12) United States Patent
Zhang et al.

(10) Patent No.: US 12,750,860 B2
(45) Date of Patent: Sep. 29, 2026

(54) METHODS AND APPARATUSES FOR RANDOM ACCESS

(71) Applicant: Lenovo (Beijing) Limited, Beijing (CN)

(72) Inventors: Yuantao Zhang, Beijing (CN); Hongmei Liu, Beijing (CN); Zhi Yan, Beijing (CN); Yingying Li, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 442 days.

(21) Appl. No.: 18/246,907

(22) PCT Filed: Sep. 30, 2020

(86) PCT No.: PCT/CN2020/119506
§ 371 (c)(1),
(2) Date: Mar. 28, 2023

(87) PCT Pub. No.: WO2022/067707
PCT Pub. Date: Apr. 7, 2022

(65) Prior Publication Data
US 2023/0403718 A1 Dec. 14, 2023

(51) Int. Cl.
*H04W 72/232* (2023.01)
*H04L 5/00* (2006.01)
(Continued)

(52) U.S. Cl.
CPC ..... *H04W 72/232* (2023.01); *H04W 72/0457* (2023.01); *H04W 72/1263* (2013.01); *H04W 72/543* (2023.01); *H04W 74/0833* (2013.01)

(58) Field of Classification Search
CPC ........... H04W 72/232; H04W 72/0457; H04W 72/1263; H04W 72/543; H04W 74/0833;
(Continued)

(56) References Cited

U.S. PATENT DOCUMENTS

2021/0028905 A1* 1/2021 Lei ........................ H04L 5/0044
2021/0297999 A1* 9/2021 Kim .................. H04W 72/0453
(Continued)

FOREIGN PATENT DOCUMENTS

CN 106961713 A 7/2017
CN 110035528 A 7/2019
(Continued)

OTHER PUBLICATIONS 20955732.1 , "Extended European Search Report", EP Application No. 20955732.1, Apr. 11, 2024, 12 pages.
(Continued)

*Primary Examiner* — Harry H Kim
(74) *Attorney, Agent, or Firm* — FIG. 1 Patents

(57) ABSTRACT

Disclosed are methods for a random access. One embodiment of the subject application provides a method performed by a user equipment, comprising sending a first message including a preamble; receiving a downlink control information (DCI) for scheduling a second message; determining a first resource, which is allocated based on a first resource unit; determining existence of a second resource, which is allocated based on a second resource unit, according to the DCI; and receiving the second message based on the determination. Related apparatuses are also disclosed.

15 Claims, 7 Drawing Sheets

(51) Int. Cl.

| | |
|---|---|
| ***H04W 72/0457*** | (2023.01) |
| ***H04W 72/1263*** | (2023.01) |
| ***H04W 72/543*** | (2023.01) |
| ***H04W 74/00*** | (2009.01) |
| ***H04W 74/0833*** | (2024.01) |

(58) Field of Classification Search
CPC ... H04W 74/002; H04L 5/0053; H04L 5/0094
See application file for complete search history.

(56) References Cited

U.S. PATENT DOCUMENTS

| | | | | |
|---|---|---|---|---|
| 2021/0329701 | A1* | 10/2021 | Lei | H04W 72/044 |
| 2022/0272760 | A1* | 8/2022 | Murray | H04W 74/0836 |
| 2023/0015550 | A1* | 1/2023 | Lin | H04L 5/0012 |
| 2023/0027824 | A1* | 1/2023 | Lee | H04W 74/0833 |

FOREIGN PATENT DOCUMENTS

| | | | | |
|---|---|---|---|---|
| CN | 110366262 | A | 10/2019 | |
| CN | 110999404 | A | 4/2020 | |
| CN | 111052657 | A | 4/2020 | |
| CN | 111357358 | A | 6/2020 | |
| CN | 113766659 | A | 12/2021 | |
| WO | WO-2019200616 | A1 * | 10/2019 | H04W 72/04 |
| WO | 2020166842 | A1 | 8/2020 | |

OTHER PUBLICATIONS

Ericsson , “Coverage recovery and capacity impact for RedCap”, 3GPP Draft; R1-2005236, vol. RAN WG1, No. e-Meeting, Aug. 8, 2020, Retrieved from the Internet: <URL:https://ftp.3gpp.org/tsg_ran/WG 1 RL 1/TSGR1_102-e/Docs/R1-2005236.zip R1-2005236 Coverage recovery and capacity impact for Redcap.docx>, Aug. 8, 2020, 22 pages.

NTT Docomo, Inc. , et al., “DL/UL resource allocation”, 3GPP Draft; R1-1720821, vol. RAN WG1, No. Reno, USA, Nov. 18, 2017, Retrieved from the Internet: <URL:http://www.3gpp.org/ftp/tsg%5Fran/WG1 %5FRL 1 /TSGR1 %5F91 / Docs/>, Nov. 18, 2017, 12 pages.

Qualcomm Incorporated , “Considerations for Coverage Recovery of RedCap Devices”, 3GPP Draft; R1-2004495, 3GPP, vol. RAN WG1, No. e-Meeting, May 16, 2020, <URL:https://ftp.3gpp.org/tsg_ran/WG 1 RL 1/TSGR1_101-e/Docs/R 1-2004495.zip R 1-2004495 Considerations for Coverage Recovery of RedCap Devices.docx>, May 16, 2020, 8 pages.

Samsung , “Access barring and UE capability”, 3GPP Draft; R1-2006156, vol. RAN WG1, No. e-Meeting, Aug. 7, 2020, Retrieved from the Internet: <URL:https://ftp.3gpp.org/tsg_ran/WG 1 _RL 1/TSGR1_102-e/Docs/R1-2006156.zip R1-2006156 Considerations on access barring v2.doc>, Aug. 17, 2020, 2 pages.

Ericsson , “DL/UL resources allocation”, 3GPP TSG-RAN1#92Bis, R1-1805188, Sanya, China [retrieved Mar. 29, 2023]. Retrieved from the Internet <https://www.3gpp.org/ftp/TSG_RAN/WG1_RL1/TSGR1_92b/Docs/>., Apr. 2018, 13 Pages.

PCT/CN2020/119506 , “International Preliminary Report on Patentability”, PCT Application No. PCT/CN2020/119506, Apr. 13, 2023, 5 pages.

PCT/CN2020/119506 , “International Search Report and Written Opinion”, PCT Application No. PCT/CN2020/119506, Jul. 1, 2021, 6 pages.

Foreign Office Action issued in CN 202080105422.9, mailed Apr. 17, 2026, 27 pages.

* cited by examiner

| Fields | Number of bits |
|---|---|
| A first resource allocation | $\lceil \log_2(N_{RU1}^{DL,BWP}(N_{RU1}^{DL,BWP}+1)/2) \rceil$ |
| Time domain resource allocation | 4bits |
| Virtual resource block (VRB) – to - physical resource block (PRB) mapping | 1bit |
| Modulation and coding scheme (MCS) | 5bits |
| Transport block (TB) scaling | 2bits |
| A second resource allocation | $\lceil (\log_2(N_{RU2}^{DL,BWP}(N_{RU2}^{DL,BWP}+1)/2)) \rceil$ |
| Reserved bits | $16 - \lceil (\log_2(N_{RU2}^{DL,BWP}(N_{RU2}^{DL,BWP}+1)/2)) \rceil$ |

Figure 3

| Fields | Number of bits |
|---|---|
| A first resource allocation | $\lceil \log_2(N_{RU1}^{DL,BWP}(N_{RU1}^{DL,BWP}+1)/2) \rceil$ |
| Time domain resource allocation | 4 bits |
| Virtual resource block (VRB) – to - physical resource block (PRB) mapping | 1 bit |
| Modulation and coding scheme (MCS) | 5 bits |
| Transport block (TB) scaling | 2 bits |
| An existence indication | 1 bit |
| A second resource allocation | $\lceil (\log_2(N_{RU2}^{DL,BWP}(N_{RU2}^{DL,BWP}+1)/2)) \rceil$ |
| Reserved bits | $15 - \lceil (\log_2(N_{RU2}^{DL,BWP}(N_{RU2}^{DL,BWP}+1)/2)) \rceil$ |

Figure 4

| Fields | Number of bits |
|---|---|
| A first resource allocation | $\lceil \log_2(N_{RU1}^{DL,BWP}(N_{RU1}^{DL,BWP}+1)/2)\rceil$ |
| Time domain resource allocation | 4 bits |
| Virtual resource block (VRB) - to - physical resource block (PRB) mapping | 1 bit |
| Modulation and coding scheme (MCS) | 5 bits |
| Transport block (TB) scaling | 2 bits |
| A slot indication | 2 bit |
| A second resource allocation | $\lceil(\log_2(N_{RU2}^{DL,BWP}(N_{RU2}^{DL,BWP}+1)/2))\rceil$ |
| Reserved bits | $14-\lceil(\log_2(N_{RU2}^{DL,BWP}(N_{RU2}^{DL,BWP}+1)/2))\rceil$ |

Figure 7

| Fields | Number of bits |
|---|---|
| A first resource allocation | $\lceil \log_2(N_{RU1}^{DL,BWP}(N_{RU1}^{DL,BWP}+1)/2)\rceil$ |
| Time domain resource allocation | 4 bits |
| Virtual resource block (VRB) - to - physical resource block (PRB) mapping | 1 bit |
| Modulation and coding scheme (MCS) | 5 bits |
| Transport block (TB) scaling | 2 bits |
| A slot indication | 2 bit |
| An existence indication | 1 bit |
| A second resource allocation | $\lceil(\log_2(N_{RU2}^{DL,BWP}(N_{RU2}^{DL,BWP}+1)/2))\rceil$ |
| Reserved bits | $13-\lceil(\log_2(N_{RU2}^{DL,BWP}(N_{RU2}^{DL,BWP}+1)/2))\rceil$ |

Figure 8

METHODS AND APPARATUSES FOR RANDOM ACCESS

TECHNICAL FIELD

Various exemplary embodiments relate to methods and apparatuses for random accesses (RA).

BACKGROUND OF THE INVENTION

In 3GPP (3rd Generation Partnership Project), in addition to legacy user equipments (UEs), various new types of UEs have emerged, such as industrial wireless sensors, video surveillances, wearables, and etc. Different to the legacy UEs (e.g., enhanced mobile broadband (eMBB) and ultra-reliable low latency communication (URLLC) UEs), these new types of UEs may have the features including e.g., reduced number of receive/transmit antennas, UE bandwidth reduction, half frequency-division duplex, relaxed UE processing time, relaxed UE processing capability, or etc. These new types of UEs can be referred to as reduced capability (RedCap) UEs.

The RedCap UEs could access the network with full backward compatibility. Therefore, same with the legacy UEs, the RedCap UEs could detect legacy SSBs to synchronize to downlink (DL), obtain physical cell ID and the information in master information block (MIB), etc., and then the RedCap UEs could detect legacy system information block 1 (SIB1) in the initial bandwidth part (BWP). Based on the configurations in SIB1, the legacy UEs may then detect paging and/or start random access (RA) procedure depending on e.g., DL/uplink (UL) data availability, and finish the initial access procedure.

During the RA procedure, acting as the legacy UE in the RA procedure, in the first step, the RedCap UE sends a first message (Msg1) to the base station (BS), which includes a preamble. The RedCap UE then starts a ra-responsewindow, during which the RedCap UE try to detect a second message (Msg2). The Msg2 might contain at least one RA responses (RARs) to at least one UE from which the BS receives an Msg1, wherein the at least one UE may include at least one legacy UE and/or at least one RedCap UE. Upon detecting the Msg2 and find its RAR from the Msg2, a UE then further sends an Msg3 based on the scheduling information in the Msg2. The Msg3 contains mainly a contention resolution ID, which is either the UE ID or a randomly selected value. If the UE detects a same contention resolution ID in Msg4 sent from the BS, the UE treats the random access procedure successfully completed.

SUMMARY

One embodiment of the subject application provides a method performed by a user equipment (UE), including: sending a first message including a preamble, receiving a downlink control information (DCI) for scheduling a second message, determining a first resource, which is allocated based on a first resource unit (RU), determining existence of a second resource, which is allocated based on a second RU, according to the DCI, and receiving the second message based on the determination.

Another embodiment of the subject application provides a method performed by a user equipment (UE), including: receiving at least one first message, wherein each of the at least one first message including a preamble, determining an allocation of a second resource based on a second RU in addition to a first resource based on a first RU, according to the at least one first message based on a first RU, sending a downlink control information (DCI) for scheduling at least one second message based on the determination, and sending at least one second message in the determined resources.

A further embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a UE. The method includes: sending a first message including a preamble, receiving a DCI for scheduling a second message, determining a first resource, which is allocated based on a first RU, determining existence of a second resource, which is allocated based on a second RU, according to the DCI, and receiving the second message based on the determination.

A further embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a UE. The method includes: receiving at least one first message, wherein each of the at least one first message including a preamble, determining an allocation of a second resource based on a second RU in addition to a first resource based on a first RU, according to the at least one first message based on a first RU, sending a downlink control information (DCI) for scheduling at least one second message based on the determination, and sending at least one second message in the determined resources.

BRIEF DESCRIPTION OF THE DRAWINGS

Some example embodiments will now be described, by way of non-limiting examples, with reference to the accompanying drawings.

FIG. 3 illustrates an example of the DCI according to the embodiments of the present disclosure.

FIG. 4 illustrates an example of the DCI according to the embodiments of the present disclosure.

FIG. 7 illustrates an example of the DCI according to the embodiments of the present disclosure.

FIG. 8 illustrates an example of the DCI according to the embodiments of the present disclosure.

DETAILED DESCRIPTION

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G and so on. It is contemplated that along with developments of network architectures and new service scenarios, all embodiments in the present application are also applicable to similar technical problems, and moreover, the terminologies recited in the present application may change, which should not affect the principle of the present application.

The present disclosure generally relates to an RA procedures, especially relates to Msg2 during an RA.

Since the RedCap UEs could access the network with full backward compatibility, the network could configure same Msg1 resources for both the RedCap UEs and the legacy UEs. When a RedCap UE and a legacy UE access the network simultaneously and send Msg1 preambles in the same resources, the network could multiplex the RARs for the UEs in the same medium access control (MAC) protocol data unit (PDU) and schedule the Msg2 transmission for the UEs.

However, the coverage of RedCap UEs might be much worse than the legacy UEs due to fewer antennas for receiving, e.g., a RedCap having one antenna for receiving VS a legacy UE having 4 antennas for receiving (mandatory for some bands); furthermore, in some cases, there is an additional 3 dB loss due to small form factor for wearables of the RedCap UEs. Therefore even with the scheme of transport block (TB) scaling, which is used for enhancing Msg2 detection performance, it is possible that Msg2 is still the bottleneck and could not be detected by the RedCap UEs. This results in RA failure and unnecessary random access channel (RACH) attempts, which makes inefficient resource usage and means also higher power consumption in RA procedure.

The present disclosure provides various methods, embodiments, and examples about improve Msg2 coverage for RedCap UEs for the case that RARs for legacy UEs and the RedCap are multiplexed and transmitted together from a BS.

In some embodiments of the present disclosure, the BS may be referred to as an access point, an access terminal, a base, a base unit, a macro cell, a Node-B, an evolved Node B (eNB), a generalized NodeB (gNB), a Home Node-B, a relay node, or a device, or described using other terminology used in the art.

Figure 1:
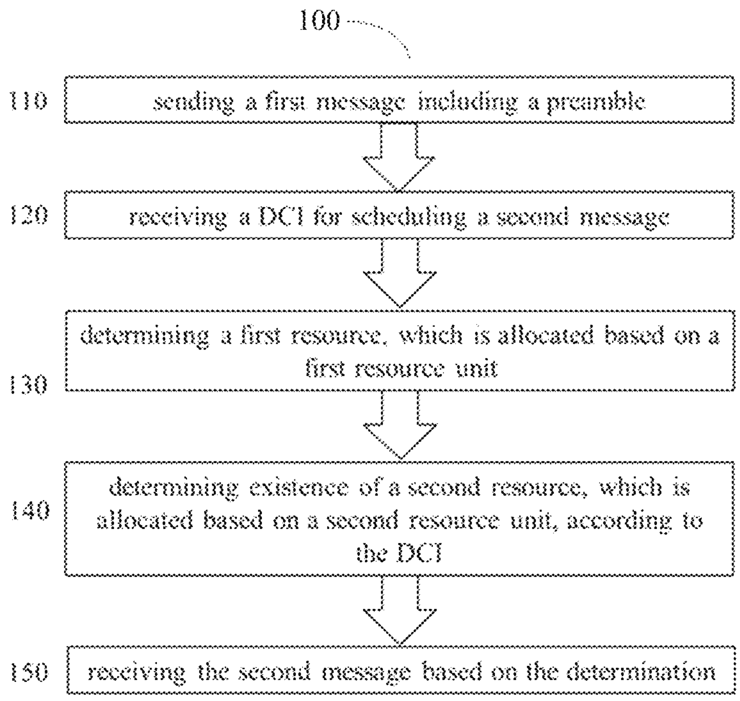
FIG. 1 illustrates an exemplary method for an RA, in accordance with some embodiments of the present disclosure.

FIG. 1 illustrates an exemplary method 100 performed by a UE to perform a RA according to the present disclosure.

As shown in FIG. 1, the method 100 may at least include an operation 110 of sending a first message (i.e., an Msg1) including a preamble, an operation 120 of receiving a downlink control information (DCI) for scheduling a second message (i.e., an Msg2), an operation 130 of determining a first resource, which is allocated based on a first RU, an operation 140 of determining existence of a second resource, which is allocated based on a second RU, according to the DCI, and an operation 150 of receiving the second message based on the determination.

Figure 2:
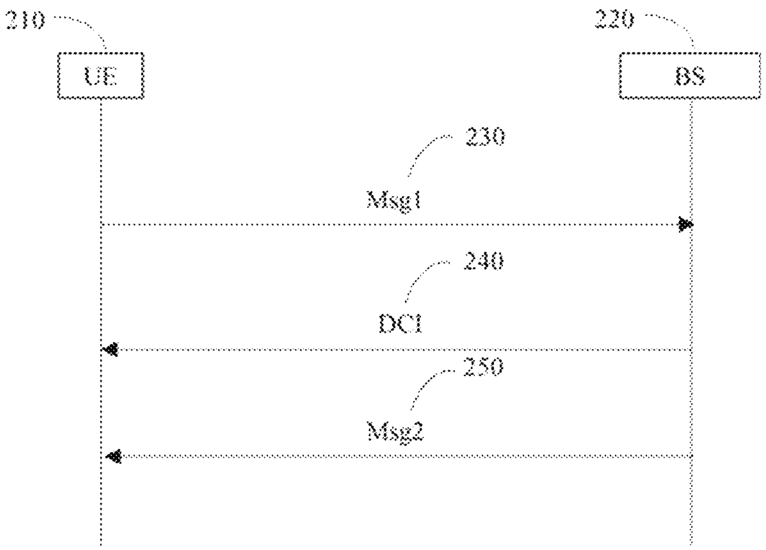
FIG. 2 illustrates an exemplary signal sequence for an RA, in accordance with some embodiments of the present disclosure.

FIG. 2 illustrates an exemplary signal sequence of an RA procedure according to the method 100.

As shown in FIG. 2 in combination with FIG. 1, in the operation 110, the UE 210 sends an Msg1 230 to the BS 220; in the operation 120, the UE 210 receives a DCI 240 for scheduling an Msg2 250 from the BS 220; in the operation 130, the UE 210 determines a first resource according to the DCI 240, i.e., the UE 210 determines an allocation of the first resource; in the operation 140, the UE 210 determines whether there is a second resource allocated according to the DCI 240, i.e., the UE 210 determines whether the second resource is existed according to the DCI 240, if the second resource is allocated or existed, the UE 210 determines the allocation of the second resource according to the DCI 240; and in the operation 150, the UE 210 receives the Msg2 250 from the BS 220 based on the determination.

In some embodiments, the DCI 240 is a DCI format 1_0.

In some embodiments, the first resource includes at least one first RU.

In some embodiments, the first RU is a resource block (RB).

In some embodiments, the second resource includes at least one second RU.

In some embodiments, if only the first resource is allocated, the Msg2 TB is encoded and transmitted in the first RUs of the first resource.

In some embodiments, if both the first resource and the second resource are allocated, the TB is encoded and transmitted in the first RUs of the first resource and the second RUs of the second resource.

In some embodiments, for each second RU of the second resource, a redundancy version (RV) pattern could be used along with an ascending order or descending order of the second RUs of the second resource.

In some embodiments, the UE may further send a Msg3 to the BS and receive a Msg4 from the BS.

FIG. 3 illustrates an example of the DCI 240 according to the embodiments of the present disclosure.

Referring to FIG. 3, the first resource configuration and the second resource configuration are respectively regarding the first resource allocation and the second resource allocation in frequency domain.

The first resource is always existed or allocated by the BS. The first resource allocation occupies the number $$\lceil \log_2(N_{RU1}^{DL,BWP}(N_{RU1}^{DL,BWP}+1)/2) \rceil$$

of bits in the DCI 240, wherein $$N_{RU1}^{DL,BWP}$$

is the number of the first RUs in the downlink (DL) bandwidth part (BWP) accommodating the first resource and the second resource.

In some embodiments, the size of the first RU equals to an RB, the first resource allocation occupies the number $$\lceil \log_2(N_{RB}^{DL,BWP}(N_{RB}^{DL,BWP}+1)/2) \rceil$$

of bits in the DCI 240, wherein $$N_{RB}^{DL,BWP}$$

is the number of the resource blocks (RBs) in the DL BWP

The TB scaling field in the DCI shown in FIG. 3 determines the scaling factor. In some embodiments, for example, the scaling factor is decided by Table 1.

TABLE 1

| TB scaling filed | scaling factor |
|---|---|
| 00 | 1 |
| 01 | 0.5 |
| 10 | 0.25 |
| 11 | NA |

The second resource allocation occupies the number $$\lceil \log_2(N_{RU2}^{DL,BWP}(N_{RU2}^{DL,BWP}+1)/2) \rceil$$

of bits in the DCI 240, wherein $$N_{RU2}^{DL,BWP}$$

is the number of the second RUs in the DL BWP accommodating the first resource and the second resource.

In some embodiments, the second resource is not existed (or not allocated by the BS). If the second resource is not existed, the second resource allocation is meaningless.

The UE needs to determine whether the second resource is existed or allocated. If the second resource is existed, the UE 210 may determines an allocation of the second resource according to the second resource allocation included in the DC 240, wherein the second resource allocation occupies the number $$\lceil \log_2(N_{RU2}^{DL,BWP}(N_{RU2}^{DL,BWP}+1)/2) \rceil$$

of bits in the DCI 240, and $$N_{RU2}^{DL,BWP}$$

is the number of the second RUs in the DL BWP.

The size of the DL BWP equals to the total size of all the first RUs, and equals to the total size of all the second RUs.

In some embodiments, a size of the second RU equals to a size of the first RU. In some embodiments, the size of the second RU is larger than the size of the first RU.

In some embodiments, the existence of the second resource is determined by the value of the TB scaling factor. If the scaling factor determined by the TB scaling in the DCI 240 is 1, the second resource is not existed or is not allocated by the BS (e.g., the BS 220); if the scaling factor is less than 1 (e.g., the scaling factor is 0.5 or 0.25), the second resource is existed or is allocated by the BS.

In some embodiments, the DCI 240 includes an existence indication directly indicates whether the second resource is existed. The existence indication may occupy at least one bit. If the existence indication indicates that the second resource is existed, the UE 210 may determine the second resource according to the second resource allocation included in the DCI 240.

For example, the existence indication occupy 1 bit, wherein value 0 means that the second resource is not existed, and value 1 means that the second resource is existed. The exemplary corresponding DCI 240 including the existence indication is shown in FIG. 4.

In some embodiments, the existence of the second resource unit is determined by the amount of overlapped resource between the first resource defined in the DCI and the second resource defined in the DCI. An overlapping ratio R is determined by the first resource allocation and the second resource allocation included in the DCI; if the overlapping ration R is lower than an overlapping threshold, the second resource is existed or allocated; otherwise, the second resource is not existed. The overlapping threshold is configured by the BS or the UE, or is predefined. If the overlapping ratio is lower than the overlapping threshold, the UE 210 may determine the allocation of the second resource according to the second resource allocation included in the DCI (e.g., the DCI 240).

The overlapping ratio R is determined as:

$$R = \frac{S_{overlapped}}{S_2^{DK,BWP}} \quad \text{(equation 1)}$$

In the equation 1, $S_{overlapped}$ is the size of the overlapped part between the first resource and the second resource, and $$S_2^{DL,BWP}$$

is the size of the second resource in the DL BWP.

In some embodiments, the size $S_{overlapped}$ is in terms of the number of the first RUs, and the size $$S_2^{DL,BWP}$$

is in terms of the number of the first RUs.

Figure 5:
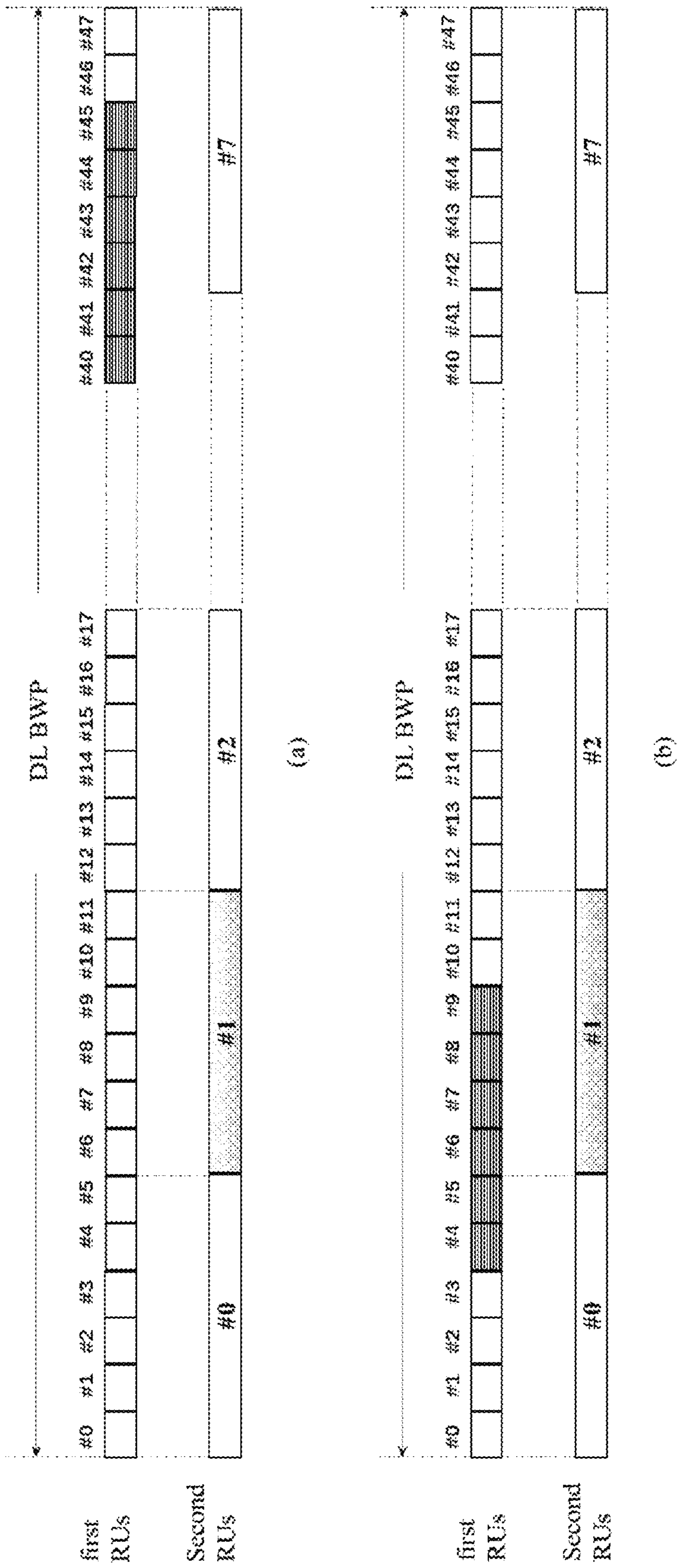
FIG. 5 (including 5(*a*) and 5(*b*)) illustrates examples of overlapping ratio.

FIG. 5 (including 5(*a*) and 5(*b*)) illustrates several examples of overlapping ratio R of the first resource and the second resource.

As shown in FIG. 5(*a*), the size of the DL BWP equals to 48 first RUs: first RU #0, first RU #1, . . . , first RU #47, . . . , i.e., $$N_{RU1}^{DL,BWP}$$

is 48, wherein the first resource occupies 6 first RUs (i.e., first RU #40, first RU #41, . . . , first RU #45). The size of a second RU equals to a total size of 6 first RUs; therefore, the size of the DL BWP equals to 8 second RUs (i.e., second RU #0, second RU #1, . . . , second RU #7); i.e., $N_{RU2}^{DL,BWP}$ is 8, the second resource allocation corresponds to the second RU #1, i.e., the second resource allocation corresponds to first RU #6, first RU #7, . . . , first RU #11. Therefore, $S_{overlapped}$ is 0; according to equation 1, the overlapping ration R is 0. Thus, the second resource allocation included in the DCI makes the sense, the second resource is existed (or allocated).

As shown in FIG. 5(*b*), the size of the DL BWP equals to 48 first RUs: first RU #0, first RU #1, . . . , first RU #47, . . . , i.e., $N_{RU1}^{DL,BWP}$ is 48, wherein the first resource occupies 6 first RUs (i.e., first RU #4, first RU #5, . . . , first RU #9) of the DL BWP. The size of a second RU equals to a total size of 6 first RUs, it means that the size of the DL BWP equals to 8 second RUs (i.e., second RU #0, second RU #1, . . . , second RU #7), i.e., $N_{RU2}^{DL,BWP}$ is 8, the second resource allocation corresponds to second RU #1, i.e., corresponds to first RU #6, first RU #7, . . . , first RU #11. Therefore, there are four first RUs (i.e., first RU #6, first RU #7, first RU #8, and first RU #9) of the first resource are overlapped. If the unit is the first RU, the size of the overlapped part between the first resource and the second resource is equivalent to a size of 4 first RUs. If the unit is the first RU, the size $S_2^{DL,BWP}$ of the second resource is 6; according to equation 1, the overlapping ration R is ⅔. If the overlapping threshold is 0.1, as R is greater than the overlapping threshold, the second resource allocation in the DCI makes no sense; in another word, the second resource is not existed.

In some embodiments, the size of the second RU equals to the size of the first RU.

In some embodiments, the size of each of the second RUs in the DL BWP is determined by at least the number of first RUs of the first resource, i.e., the size of each of the second RU in the DL BWP is determined by at least the size of the first resource.

In some embodiments, the size of each second RU equals to the number of the first RUs of the first resource, i.e., the size of each second RU equals to the size of the first resource.

In some embodiments, the size of each of the second RU equals to the number of the first RUs of the first resource multiplied with the scaling factor configured in the DCI. In another word, the size of each second RU equals to the size of the first resource multiplied with the scaling factor, wherein the scaling factor is determined by the TB scaling included in the DCI.

In some embodiments, the size of each of the second RU is configured by the UE or the BS, or predefined.

According to the present disclosure, the second RU has a higher granularity than the first RU. The advantage is that, with TB scaling, there are relatively high amount of resources allocated for Msg2 transmission already (for example, 6 first RUs for 1-UE Msg2, with scaling factor 0.25 and modulation and coding scheme (MCS) 0); therefore, adding one or a few first RU as the second resource means only little channel code rate decrease; without UE channel status in the BS side when scheduling Msg2, this small step code rate decrease is almost meaningless. Furthermore, using high granularity second RU means lower number of bits needed in the DCI, which enables more bits reserved in the DCI for other usage.

Figure 6:
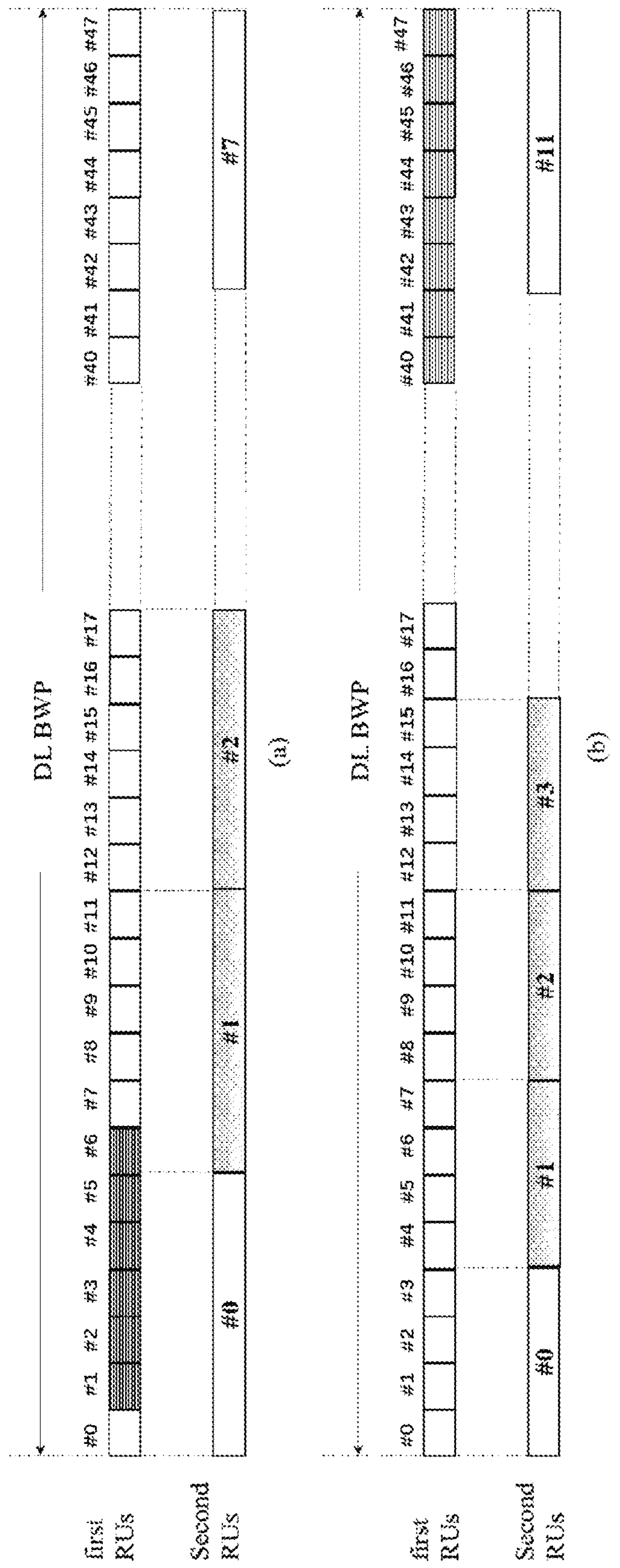
FIG. 6 (including 6(*a*) and 6(*b*)) illustrates examples of allocations of the first resource and the second resource.

FIG. 6 (including 6(*a*) and 6(*b*)) illustrates several examples about a UE determining a second resource.

As shown in FIG. 6(*a*), the size of the DL BWP has 48 first RUs: first RU #0, first RU #1 . . . first RU #47, i.e., $N_{RU1}^{DL,BWP}$ is 48, wherein the first resource occupies 6 first RUs (i.e., first RU #1, first RU #2, . . . , first RU #6). The size of a second RU equals to the size of the first resource, i.e., a second RU has 6 first RUs, the size of the DL BWP equals to total size of 8 second RUs (i.e., second RU #0, second RU #1, . . . , second RU #7), i.e., N $N_{RU2}^{DL,BWP}$ is 8.

For example, the UE determines whether a second resource is existed according to an existence indication included in the DCI. In this example, the existence indication directly indicates that the second resource is existed; therefore, the UE may directly determine the allocation of the second resource according to the second resource allocation in the DCI; in this example, the second resource includes second RU #1 and second RU #2. In this example, the scaling factor may be 1 or less than 1 (e.g., the scaling factor is 0.5 or 0.25). The first RU #6 is occupied by both the first resource and the second resource; therefore, the overlapping ration R is 1/12, it may be lower than or greater than an overlapping threshold that is possible existed. However, in this example, the UE may ignore the overlapping ration R and the scaling factor when determining the existence of the second resource.

For example, the UE determines whether a second resource is existed according to the scaling factor determined by the TB scaling in the DCI, if the scaling factor is less than 1 (e.g., the scaling factor is 0.5 or 0.25), the second resource is existed; otherwise the second resource is not existed. In this example, the scaling factor is 0.5: therefore, the UE determines the second resource is existed, then the UE determines the allocation of the second resource according to the second resource allocation in the DCI. In this example, the second resource includes second RU #1 and second RU #2. The overlapping ration R between the first resource and the second resource is 1/12, it may be lower than or greater than an overlapping threshold that is possible existed, but in this example, the UE may ignore the overlapping ratio R when determining the existence of the second resource.

For example, the UE determines whether a second resource is existed according to the overlapping ratio R between the first resource and the second resource. In this example, the first resource occupies 6 first RUs (i.e., first RU #1, first RU #2, . . . , first RU #6) of the DL BWP, and the second resource occupies the second RU #1 and the second RU #2 (i.e., the first RU #6, the first RU #7, . . . , the first RU #17); therefore, the first RU #6 is occupied by the first resource and the second resource, the overlapping ratio R between the first resource and the second resource is 1/12; if the overlapping threshold is predefined or configured to be greater than 1/6, then the overlapping ratio R is lower than the overlapping threshold; accordingly, the UE determines that the second resource is existed, and determines the allocation according to the second resource allocation included in the DCI. In this example, the allocation of the second resource includes second RU #1 and second RU #2. Furthermore, in this example, the scaling factor may be 1 or less than 1 (e.g., the scaling factor is 0.5 or 0.25), but the UE may ignore the scaling factor w % ben determining the existence of the second resource.

As shown in FIG. 6(*b*), the DL BWP has 48 first RUs: first RU #0, first RU #1, . . . , first RU #47.

$$N_{RU1}^{DL,BWP}$$

is 48, the first resource occupies 8 first RUs (i.e., first RU #40, first RU #41 . . . , first RU #47) of the DL BWP according to the first resource allocation. The scaling factor determined by TB scaling in the DCI is 0.5, the size of a second RU equals to the size of the first resource multiplied with the scaling factor; therefore, the size of each second RU equals to a size of 4 first RUs, the size of the DL BWP equals to a size of 12 second RUs (i.e., second RU #0, second RU #1, . . . , second RU #11), i.e., $$N_{RU2}^{DL,BWP}$$

is 12.

For example, the UE determines whether a second resource is existed according to an existence indication included in the DCI directly indicating whether a second resource is existed. In this example, the existence indication directly indicates that the second resource is existed; therefore, the UE determines the allocation of the second resource according to the second resource allocation in the DCI; in this example, the allocation of the second resource includes second RU #1, second RU #2, and second RU #3. The overlapping ratio R between the first resource and the second resource is 0. However, in this example, the UE may not care about the value of the scaling factor and the overlapping ratio R when determining the existence of the second resource.

For example, the UE determines whether a second resource is existed according to the scaling factor determined by the TB scaling in the DCI, if the scaling factor is less than 1 (e.g., the scaling factor is 0.5 or 0.25), the second resource is existed; otherwise the second resource is not existed. In this example, the scaling factor is 0.5: therefore, the UE determines the second resource is existed, then the UE determines the allocation of the second resource according to the second resource allocation included in the DCI; in this example, the allocation of the second resource includes second RU #1, second RU #2, and second RU3. In this example, the overlapping ration R between the first resource and the second resource is 0, but the UE may not care about the overlapping ration R.

For example, the UE determines whether a second resource is existed according to the overlapping ratio R determined by the first resource allocation and the second resource allocation included in the DCI. In this example, the first resource occupies 8 first RUs (i.e., first RU #40, first RU #41, . . . , first RU #47) of the DL BWP, and the second resource occupies 3 second RUs (i.e., the second RU #1, the second RU #2, and the second RU #3), corresponding to total 12 first RUs (i.e., the first RU #4, the first RU #5, . . . , the first RU #15); therefore, there is no first RU occupied by both the first resource and the second resource, the overlapping ratio R between the first resource and the second resource is 0, it is lower than the overlapping threshold configured by the UE or the BS or predefined; then the UE determines that the second resource is existed. In this example, the allocation of the second resource includes the second RU #1, the second RU #2, and the second RU #3. In this example, the scaling factor is 0.5, but the UE may ignore the value of the scaling factor when determining whether the second resource is existed.

In some embodiments, the UE determines whether a second resource is existed depending on both the value of the scaling factor and the overlapping ratio R. The second resource is existed only when the scaling factor is less than 1 (e.g., the scaling factor is 0.5 or 0.25), and the overlapping ratio R is below an overlapping threshold.

In some embodiments, the first resource and the second resource may be allocated in the same time slot.

In some embodiments, the first resource and the second resource may be allocated in different time slots.

In some embodiments, the DCI may further include a slot indication indicating which slot the second resource is allocated in. The slot indication occupies at least one bit in the DCI.

FIG. 7 illustrates a DCI including a slot indication. In this example, the slot indication occupies two bits. The DCI includes a second resource allocation and a slot indication.

In some embodiments, the DCI may further include an existence indication indicating whether the second resource is existed.

FIG. 8 illustrates a DCI including a slot indication, an existence indication, and a second resource allocation. In this example, the slot indication occupies two bits, and the existence indication occupies one bit.

In some embodiments, the first resource is always allocated, yet the second resource is conditionally allocated. This is because that if always allocating the second resource for Msg2 transmission, the frequency resource efficiency might be low.

In some embodiments, the BS may determine whether to allocate a second resource according to some factors, for example, the preambles included in the Msg1s received from the UEs for RA.

In some embodiments, the preambles in the first messages may be divided into several sets at least including a first preamble set and a second preamble set. When the BS receives at least one Msg1 that contains a preamble belonging to the first preamble set, the BS may allocate a second resource in addition to the first resource for RA. If all the preambles contained in the received Msg1s belong to the second preamble set, the BS may not allocate the second resource, it may only allocate the first resource for RA.

In some embodiments, the UEs may be sorted to different types, and the preambles of the UEs of different type belong to a different preamble set respectively. If the UE belongs to a first type of UEs, the preamble of the UE for RA belongs to a first preamble set, and if the UE belongs to a second type of UEs, the preamble of the UE for RA belongs to a second preamble set.

In some embodiments, the UEs may measure the DL channel quality (e.g., reference signal received power (RSRP), reference signal receiving quality (RSRQ), or signal to interference plus noise ratio (SINR)) and compare it with a threshold configured or predefined. If the measurement value for the DL channel quality is lower than the threshold, the UE may use a preamble of the first preamble set for RA. If the measurement value for the DL channel quality is equal to or greater than the threshold, the UE may use a preamble of the second preamble set for RA.

For example, the RedCap UEs use the preamble of the first preamble set, and the legacy UEs use the preambles of the second preamble set. If the BS receives at least one Msg1 from the RedCap UEs, which includes a preamble of the first preamble set, the BS may allocate a second resource in addition to the first resource; otherwise, if the preambles of all the Msg1s received from the UEs belong to the second preamble set, the BS only allocate the first resource.

For example, the low capability RedCap UEs use the preamble of the first preamble set, the high capability RedCap UEs and the legacy UEs use the preambles of the second preamble set. If the BS receives at least one Msg1 from the low capability RedCap UEs, the BS may allocate a second resource in addition to the first resource; otherwise, if the preambles of all the Msg1s received from the UEs belong to the second preamble set, the BS only allocate the first resource.

For example, the low channel quality RedCap UEs use the preamble of the first preamble set, the high channel quality RedCap UEs and the legacy UEs use the preambles of the second preamble set. If the BS receives at least one Msg1 from the low channel quality RedCap UEs, the BS may allocate a second resource in addition to the first resource; otherwise, if the preambles of all the Msg1s received from the UEs belong to the second preamble set, the BS only allocate the first resource.

Figure 9:
FIG. 9 illustrates an exemplary partition of the preambles.

FIG. 9 illustrates an exemplary partition of the preambles. In this example, the first preamble set are dedicated for RedCap UEs with low capability or low channel quality; the second preamble set are shared by legacy UEs and RedCap UEs with high capability or high channel quality. In some embodiments, there may be a third preamble set to an $n^{th}$ preamble set for other purpose, wherein n is a positive integer.

According to the present disclosure, by the usage of the second resource, there could be more resources in frequency domain for RedCap UEs (or RedCap UEs with low capability or low channel quality) for Msg2 transmission; therefore, the coverage for Msg2 of the RedCap UEs (or the RedCap UEs with low capability or low channel quality) are enhanced, and the detection performance of Msg2 for the RedCap UEs (or the RedCap UEs with low capability or low channel quality) are improved.

Accordingly, RA failure rate is decreased, the number of unnecessary random access channel (RACH) attempts is decreased, which makes resource usage more efficient and decreases the power consumption in RA procedure.

Furthermore, the BS may flexibly determine whether to allocate the second resource according to some factors, e.g., the preamble set (or the type of the UEs), this may reduce unnecessary waste of frequency resource, and improve the utilization of frequency resources.

Moreover, the second resource has higher granularity than the first resource, it means that the second resource may occupy less number of bits needed in the DCI, which enables more bits reserved in the DCI for possible future usage.

Figure 10:
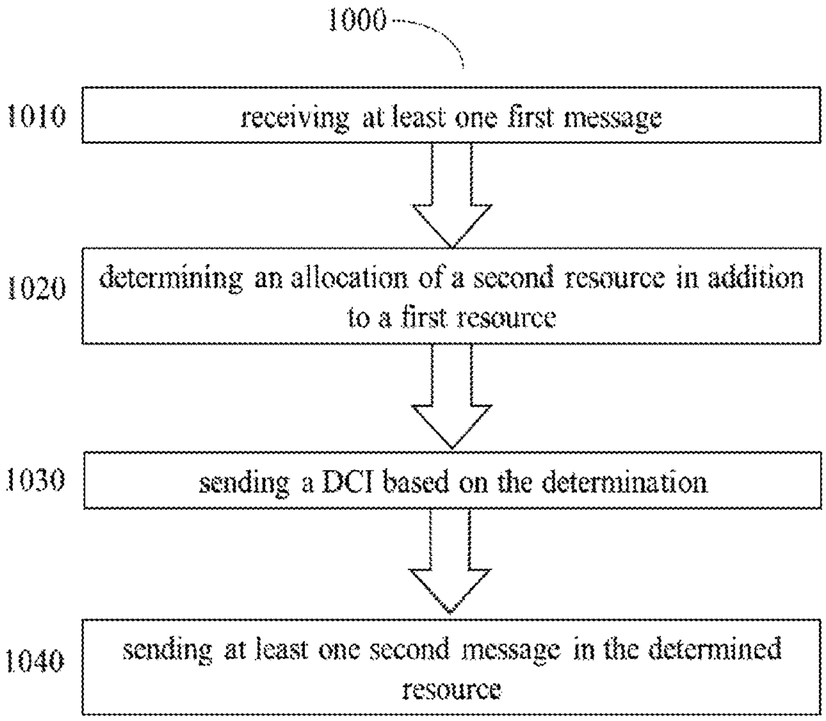
FIG. 10 illustrates an exemplary method for an RA, in accordance with some embodiments of the present disclosure.

FIG. 10 illustrates an exemplary method 1000 performed by a BS (e.g., the BS 220) to perform a RA according to the present disclosure, wherein the method 1000 corresponds to the method 100 performed by a UE (e.g., the UE 210).

As shown in FIG. 10, the method 1000 may at least include an operation 1010 of receiving at least one first message, wherein each of the at least one first message including a preamble, an operation 1020 of determining an allocation of a second resource based on a second resource unit in addition to a first resource based on a first resource unit, according to the at least one first message based on a first resource unit, an operation 1030 of sending a DCI (e.g., the DCI 240) for scheduling at least one second message based on the determination, and an operation 1040 of sending at least one second message in the determined resources.

In some embodiments, the first resource is always allocated based on a first RU, yet the second resource is conditionally allocated. The BS may flexibly determine whether to allocate the second resource according to some factors, this may reduce unnecessary waste of frequency resource, and improve the utilization of frequency resources.

In some embodiments, the BS may determine whether to allocate the second resource according to the preambles included in the received Msg1s from the UEs. The preambles in the first messages may be divided into several sets at least including a first preamble set and a second preamble set. When the BS receives at least one Msg1 that contains a preamble belonging to the first preamble set, the BS may allocate a second resource in addition to the first resource for RA. If all the preambles contained in the received Msg1s belong to the second preamble set, the BS may not allocate the second resource, it may only allocate the first resource for RA.

In some embodiments, if the BS determines to allocate a second resource, the BS may set the scaling factor for scheduling Msg2 to be less than 1. For example, the BS set the scaling factor to be 0.5 or 0.25, correspondingly, TB scaling in the DCI for scheduling Msg2 is 01 or 10 (please refer to Table 1).

In some embodiments, if the BS determines to allocate a second resource, the BS may ensure an overlapping ratio determined by an allocation of the first resource and the allocation of the second resource included in the DCI being lower than an overlapping threshold configured or predefined.

In some embodiments, the BS may use an existence indication included in the DCI to directly indicate whether a second resource is allocated.

In some embodiments, if the BS determines to allocate a second resource, the second resource is determined by the second resource allocation included in the DCI, wherein the second resource allocation occupies a number $$\lceil(\log_2(N_{RU2}^{DL,BWP}(N_{RU2}^{DL,BWP}+1)/2))\rceil$$

of bits in the DCI, wherein $$N_{RU2}^{DL,BWP}$$

is the number of the second RUs in a DL BWP accommodating the first resource and the second resource.

In some embodiments, the size of the second RU equals to the size of the first RU.

In some embodiments, the second resource is allocated based on a second RU according to the DCI.

In some embodiments, the size of the second RU is determined by at least the number of first RUs of the first resource.

In some embodiments, the size of the second RU equals to a size of a number of the first RUs of the first resource or equals to a size of a number of first RUs of the first resource multiplied with a scaling factor included in the DCI, or the size of the second RU is predefined or configured.

In some embodiments, the second resource is allocated in the same time slot where the first resource is allocated or in a time slot different from the time slot where the first resource is allocated.

In some embodiments, the DCI may further include a slot indication indicating which slot the second resource is allocated in. The slot indication occupies at least one bit in the DCI The spirit of the present disclosure is not limited to the method, embodiments, and examples described previously. Actually, these methods, embodiments, and examples may be reasonably modified and expanded, and can be reasonably combined without contradicting each other, as long as they do not violate the spirit or principle of the present invention.

For example, there may be at least one frequency resource allocated in the DL BWP in addition to the first resource that is always allocated.

For example, the BS may determine whether to allocate at least one frequency resource based on other factors, e.g., adequacy of frequency resources, interference from adjacent cells, the number of the received Msg1s, and etc.

For example, the BS may use some reserved bits from the DCI for scheduling Msg2 to enhance the coverage of Msg2 or to improve the RA performance.

For example, the UE may determine whether at least one frequency resource in addition to the first resource is existed or allocated, according to some other factors in addition to an existence indicator, an overlapping factor, or a scaling factor, or according to a combination of at least one of these factors.

Figure 11:
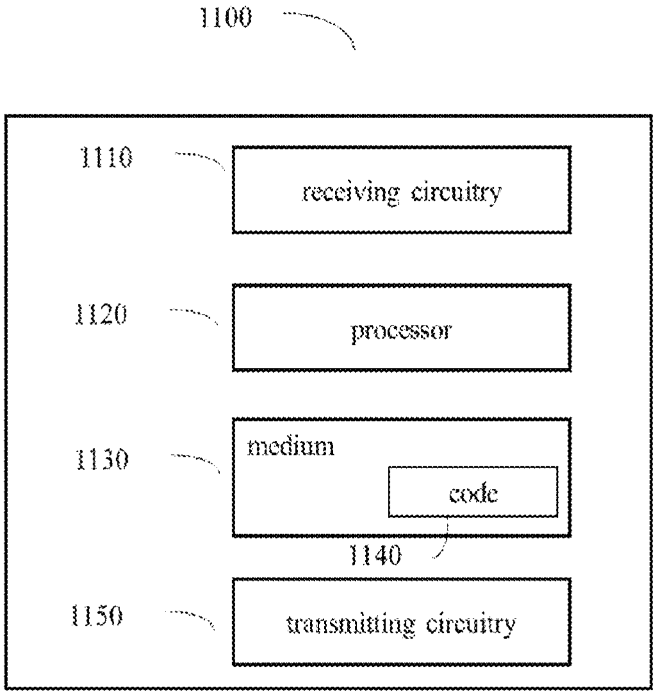
FIG. 11 illustrates an exemplary apparatus, in accordance with some embodiments of the present disclosure.

FIG. 11 illustrates an exemplary apparatus 1100 for performing an RA in an embodiment, which, for example, may be at least a part of a UE (e.g. the UE 210).

As shown in FIG. 11, the apparatus 1100 may include at least one receiving circuitry 1110, at least one processor 1120, at least one non-transitory computer-readable medium 1130 with computer-executable 1140 stored thereon, and at least one transmitting circuitry 1150. The at least one medium 1130 and the computer program code 1140 may be configured to, with the at least one processor 1120, cause the apparatus 1100 to perform at least the example methods (e.g., the method 100), and the embodiments described above, wherein, for example, the apparatus 1100 may be the UE 210 in the example method 100.

Figure 12:
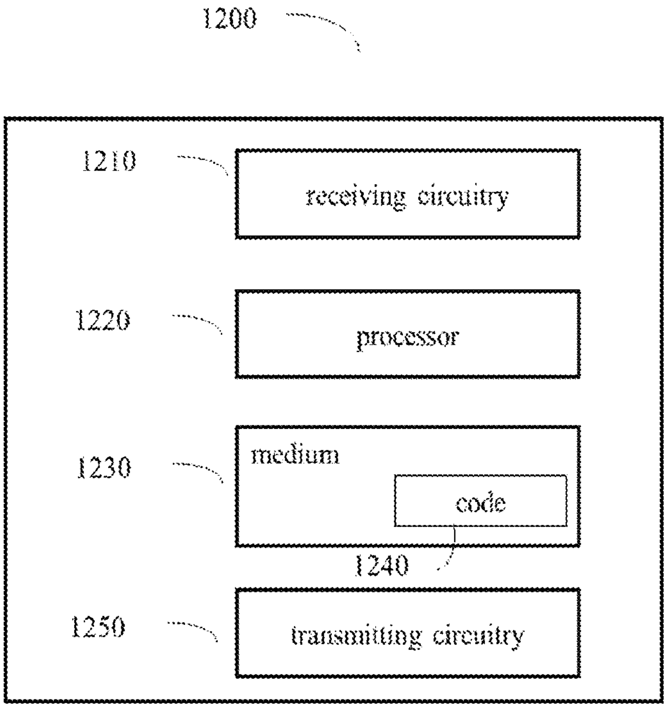
FIG. 12 illustrates an exemplary apparatus, in accordance with some embodiments of the present disclosure.

FIG. 12 illustrates an exemplary apparatus 1200 for perform an RA in an embodiment, which, for example, may be at least a part of a BS (e.g. the BS 220).

As shown in FIG. 12, the apparatus 1200 may include at least one receiving circuitry 1210, at least one processor 1220, at least one non-transitory computer-readable medium 1230 with computer program code 1240 stored thereon, and at least one transmitting circuitry 1250. The at least one medium 1230 and the computer program code 1240 may be configured to, with the at least one processor 1220, cause the apparatus 1200 to perform at least the example method 1000, and the embodiments described above.

In various example embodiments, the at least one processor 1120 or 1220 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 1120 or 1220 may also include at least one other circuitry or element not shown in FIG. 11 or 12.

In various example embodiments, the at least one medium 1130 or 1230 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least medium 1130 or 1230 may include, but are not limited to, an electric, a magnetic, an optical, an electromagnetic, an infrared, or a semiconductor system, apparatus, or device or any combination of the above.

Further, in various example embodiments, the exemplary apparatus 1600 or 1700 may also include at least one other circuitry, element, and interface, for example antenna element, and the like.

In various example embodiments, the circuitries, parts, elements, and interfaces in the exemplary apparatus 1100 or 1200, including the at least one processor 1120 or 1220 and the at least one medium 1130 or 1230, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:

at least one memory; and at least one processor coupled with the at least one memory and operable to cause the UE to:

send a first message including a preamble;

receive a downlink control information (DCI) for scheduling a second message;

determine a first resource for the second message, which is allocated based on a first resource unit; and determine existence of a second resource for the second message, which is allocated based on a second resource unit, according to the DCI, wherein:

the second resource is determined to be existed in response to one or more of a value of a scaling factor included in the DCI being ½ or ¼, or an overlapping ratio determined by an allocation of the first resource and an allocation of the second resource included in the DCI being lower than an overlapping threshold; and the preamble belongs to a first preamble set when a measurement of downlink channel quality is lower than a threshold; or the preamble belongs to a second preamble set when a measurement of downlink channel quality is equal to or greater than the threshold, wherein the threshold is indicated based on a configuration.

2. The UE of claim 1, wherein the existence of the second resource is indicated by an existence indication included in the DCI.

3. The UE of claim 1, wherein:

in response to the second resource being existed, allocation of the second resource is determined by a second resource allocation in the DCI, wherein the second resource allocation occupies a number $$\lceil(\log_2(N_{RU2}^{DL,BWP}(N_{RU2}^{DL,BWP}+1)/2))\rceil$$

of bits included in the DCI; wherein $$N_{RU2}^{DL,BWP}$$

is a number of at least one second resource unit in a downlink bandwidth part (BWP), wherein:

a size of each of the at least one second resource unit is determined by at least a number of at least one first resource unit of the first resource.

4. The UE of claim 3, wherein a size of each of the at least one second resource unit equals to the number of the at least one first resource unit of the first resource or equals to the number of the at least one first resource unit of the first resource multiplied with a scaling factor included in the DCI, or the size of each of the at least one second resource unit is predefined or configured by the UE or a base station.

5. The UE of claim 1, wherein the DCI further includes a slot indication indicating which slot the second resource is allocated in.

6. An apparatus, comprising:

a memory; and a processor coupled to the memory, the processor configured to cause the apparatus to:

receive at least one first message, wherein the at least one first message includes a preamble;

determine an allocation of a second resource based on a second resource unit in addition to a first resource based on a first resource unit, according to the at least one first message based on the first resource unit, wherein the second resource is determined to be allocated in response to at least one preamble of the at least one first message belonging to a first preamble set; and the second resource is determined not to be allocated in response to each preamble of the at least one first message belonging to a second preamble set;

send a downlink control information (DCI) for scheduling at least one second message based on the determination; and send at least one second message in the determined resources.

7. The apparatus of claim 6, wherein in response to the second resource being determined to be allocated, the processor is configured to cause the apparatus to one or more of:

set a value of a scaling factor included in the DCI to be ½ or ¼; or cause an overlapping ratio determined by an allocation of the first resource and the allocation of the second resource included in the DCI to be lower than an overlapping threshold.

8. The apparatus of claim 6, wherein the processor is configured to cause the apparatus to set an existence indication included in the DCI directly indicating whether the second resource is allocated.

9. The apparatus of claim 6, wherein in response to the second resource being determined to be allocated, the allocation of the second resource is determined by a second resource allocation, wherein the second resource allocation occupies a number $$\lceil(\log_2(N_{RU2}^{DL,BWP}(N_{RU2}^{DL,BWP}+1)/2))\rceil$$

of bits included in the DCI; wherein $$N_{RU2}^{DL,BWP}$$

is a number pf at least one second resource unit in a downlink BWP, and wherein a size of each of the at least one second resource unit is determined by at least a number of first resource units of the first resource.

10. The apparatus of claim 9, wherein:

the size of each of the at least one second resource unit is equal to the number of the at least one first resource unit of the first resource;

the size of each of the at least one second resource unit is equal to the number of the at least one resource unit of the first resource multiplied with a scaling factor included in the DCI; or the size of each of the at least one second resource unit is one or more of predefined or configured by one or more of a user equipment (UE) or a base station.

11. A method, comprising:

sending, by a user equipment (UE), a first message including a preamble;

receiving a downlink control information (DCI) for scheduling a second message;

determining a first resource for the second message, which is allocated based on a first resource unit; and determining existence of a second resource for the second message, which is allocated based on a second resource unit, according to the DCI, wherein:

the second resource is determined to be existed in response to one or more of a value of a scaling factor included in the DCI being ½ or ¼, or an overlapping ratio determined by an allocation of the first resource and an allocation of the second resource included in the DCI being lower than an overlapping threshold; and the preamble belongs to a first preamble set if one or more of the UE belongs to a first type of UEs or a measurement of downlink channel quality is lower than a threshold; or the preamble belongs to a second preamble set if the UE belongs to a second type of UEs or a measurement of downlink channel quality is equal to or greater than the threshold.

12. The method of claim 11, wherein the existence of the second resource is indicated by an existence indication included in the DCI.

13. The method of claim 11, wherein:

in response to the second resource being existed, allocation of the second resource is determined by a second resource allocation in the DCI, wherein the second resource allocation occupies a number $$\left\lceil \left(\log_2\left(N_{RU2}^{DL,BWP}\left(N_{RU2}^{DL,BWP}+1\right)/2\right)\right)\right\rceil$$

of bits included in the DCI; wherein $$N_{RU2}^{DL,BWP}$$

is a number of at least one second resource unit in a downlink bandwidth part (BWP), wherein:

a size of each of the at least one second resource unit is determined by at least a number of at least one first resource unit of the first resource.

14. The method of claim 13, wherein a size of each of the at least one second resource unit equals to the number of the at least one first resource unit of the first resource or equals to the number of the at least one first resource unit of the first resource multiplied with a scaling factor included in the DCI, or the size of each of the at least one second resource unit is predefined or configured by the UE or a base station.

15. The method of claim 11, wherein the DCI further includes a slot indication indicating which slot the second resource is allocated in.

* * * * *